United States Patent [19]
Wang

[11] Patent Number: 5,809,813
[45] Date of Patent: Sep. 22, 1998

[54] GEAR SHIFT LOCK

[76] Inventor: Mao-Shen Wang, 9F, No. 80-2, Hsin Po First Street, Hsin Tein, Taipei Hsien, Taiwan

[21] Appl. No.: 939,083

[22] Filed: Sep. 26, 1997

[30] Foreign Application Priority Data

Sep. 15, 1997 [TW] Taiwan ................................. 86215765

[51] Int. Cl.⁶ .................................................. F16H 57/00
[52] U.S. Cl. ................................. 70/201; 70/247; 70/195
[58] Field of Search .............................. 70/201–203, 247, 70/192–197, 181–187

[56] References Cited

U.S. PATENT DOCUMENTS

| | | | |
|---|---|---|---|
| 962,448 | 6/1910 | Miller | 70/195 |
| 999,462 | 8/1911 | Miller | 70/195 |
| 1,159,973 | 11/1915 | Marhenke | 70/195 |
| 1,638,688 | 8/1927 | Fipps | 70/195 |
| 4,747,278 | 5/1988 | Roncelli et al. | 70/201 |
| 5,081,856 | 1/1992 | Hsu | 70/247 |
| 5,134,764 | 8/1992 | Taylor | 70/201 X |
| 5,329,792 | 7/1994 | Lee | 70/201 |
| 5,546,775 | 8/1996 | Lee | 70/201 |
| 5,596,894 | 1/1997 | Lee | 70/201 |

FOREIGN PATENT DOCUMENTS

| | | | |
|---|---|---|---|
| 815645 | of 0000 | France | 70/201 |
| 416526 | 11/1946 | Italy | 70/195 |
| 4283133 | 10/1992 | Japan | 70/247 |
| 173157 | 12/1921 | United Kingdom | 70/195 |

*Primary Examiner*—Suzanne Dino Barrett
*Attorney, Agent, or Firm*—Bacon & Thomas

[57] ABSTRACT

A lock adapted for use in automatic gear shifts and mounted in a gear shift head, including a core, a stop block, an escutcheon, and a cylinder. The core has latch bolts at either side, a keyway at a front end, and a projection at a rear end. The stop block has a stop hole at a front end for receiving the projection of the core, and a stop projection at a rear end. The escutcheon has an insertion hole at a front end, the insertion hole having a cross section comprised of an oval shape and a rectangular shape sized to match the stop block, a through hole at a rear end, and a lock post that passes through the through hole, the lock post including a head portion of a larger size and a press piece projecting from the rear end of the escutcheon. A spring is fitted over the press piece and that part of the lock post exposed on the outside of the rear end of the escutcheon. A lock spring is further provided on the escutcheon near the press piece and adapted to urge against the inner wall of the gear shift head. The position of said press piece corresponding to that end of a push button mounted inside the gear shift head. The cylinder has an opening at a front end for passage of a key, and a cylinder hole communicating with the opening for receiving the core. When the lock is unlocked, the press piece is pressed by the push button of the gear shift to displace and permits gear shifting. When the lock is locked, the gear shift is prevented from operation as the gear shift is stopped by the stop projection of the stop block.

1 Claim, 2 Drawing Sheets

GEAR SHIFT LOCK

BACKGROUND OF THE INVENTION (a). Field of the Invention

The present invention relates generally to a lock, and more particularly to a lock adapted for use in gear shifts.

(b). Description of the Prior Art

A conventional type of gear shift locks comprises an elongated bar adapted to lock both the gear shift and the acceleration or both the gear shift and the seat, or in other ways. The biggest problem with such conventional gear shift locks is that they are exposed on the outside and can therefore be easily damaged. Besides, it is inconvenient to lock them in position or remove them, and they have to be stored in some place when not in use.

In recent years, there have been developed locks adapted for mounting inside the gear shift at the upper end. Such recessed type locks are however complicated in structure. It is therefore desirable to have a recessed type gear shift lock that is simple in construction while providing positive locking effects.

SUMMARY OF THE INVENTION

A primary object of the present invention is to provide a gear shift lock that is simple in construction and easy to assemble while providing positive and enhanced locking effects.

In order to achieve the above-mentioned object, the lock of the present invention comprises a core, a stop block, an escutcheon, and a cylinder. The core has latch bolts at either side, a keyway at a front end, and a projection at a rear end. The block has a stop hole at a front end for receiving the projection of the core, and a stop projection at a rear end. The escutcheon has an insertion hole at a front end, the insertion hole having a cross section comprised of an oval shape and a rectangular shape sized to match the stop block, a through hole at a rear end, and a lock post that passes through the through hole, the lock post including a head portion of a larger size and a press piece projecting from the rear end of the escutcheon. A spring is fitted over the press piece and that part of the lock post exposed on the outside of the rear end of the escutcheon. A lock spring is further provided on the escutcheon near the press piece and adapted to urge against the inner wall of the gear shift head. The position of said press piece corresponding to that end of a push button mounted inside the gear shift head. The cylinder has an opening at a front end for passage of a key, and a cylinder hole communicating with the opening for receiving the core. When the lock is unlocked, the press piece is pressed by the push button of the gear shift to displace and permits gear shifting. When the lock is locked, the gear shift is prevented from operation as the gear shift is stopped by the stop projection of the stop block.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
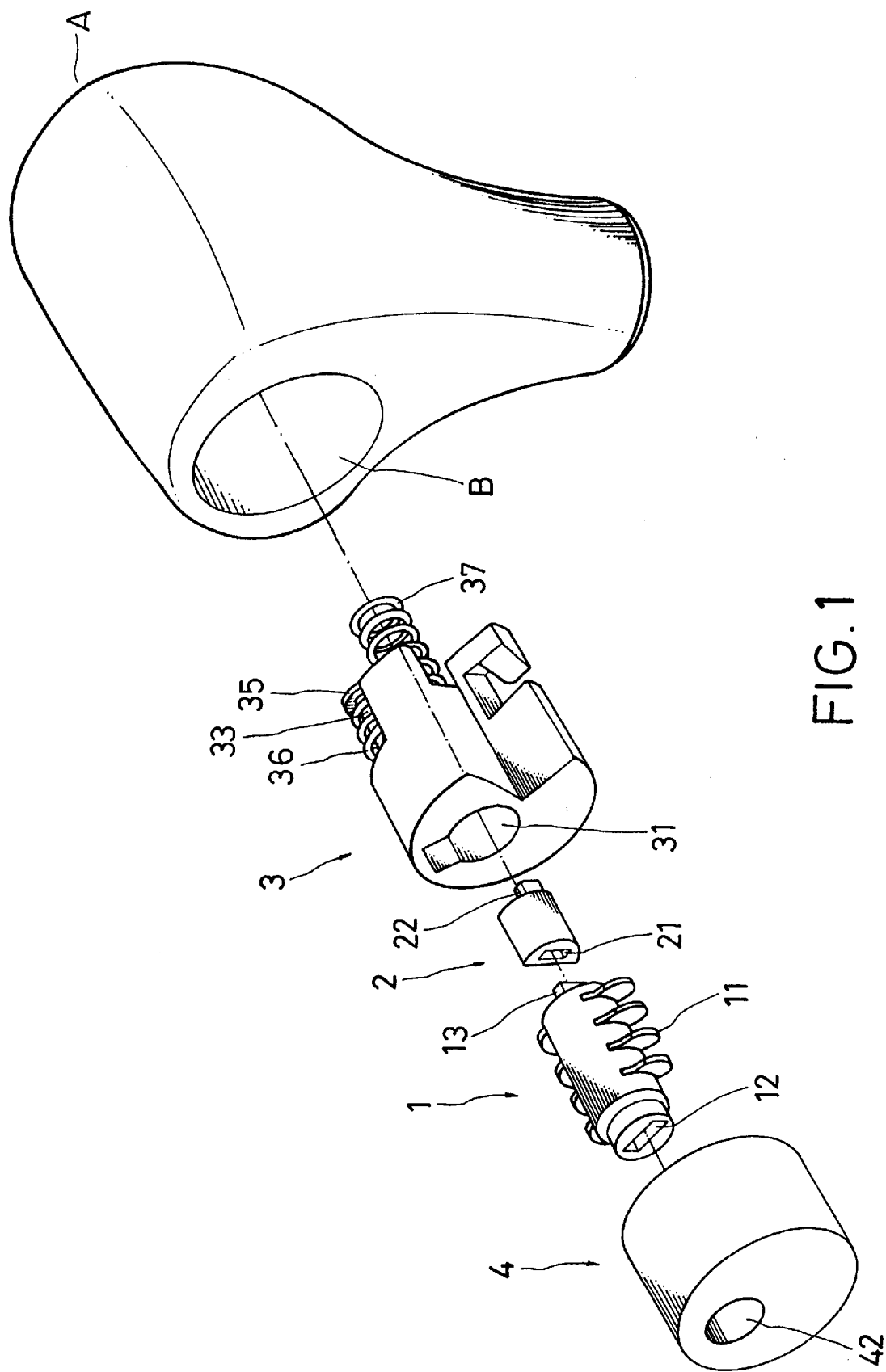
FIG. 1 is a perspective exploded view of the present invention.

As shown in the drawings, the lock of the present invention is provided internally of a head portion at the upper end of the gear shift and essentially comprises a core 1, a stop block 2, an escutcheon 3, and a cylinder 4.

The core 1 is a conventional one with a plurality of latch bolts 11 at both sides thereof. The latch bolts 1 1 may retract to conform to the shape of the inner wall of a cylinder hole 41 of the cylinder so that the latch bolts 11 may abut the inner wall of the cylinder hole 41 anytime. The core 1 further has a keyway 12 at a front end and a projection 13 at a rear end for insertable connection with the stop block.

The stop block 2 is a cylindrical body having a semicircular cross section. The stop block 2 has a stop hole 21 at a front end for receiving the projection 13 and a stop projection 22 at a rear end to serve as a stop when the invention is locked in position.

The escutcheon 3 is a fixed structure provided with an insertion hole 31 at a front end for receiving the stop block 2. The insertion hole 31 has a cross section comprising of an oval shape connected to a rectangular shape. The diameter of the oval shape corresponds to that of the stop block 2. A rear end of the escutcheon 3 is provided with through hole 32 (see FIGS. 2–4) for passage of a lock post 33. The lock post 33 includes a head portion 34 of a larger size at a front end thereof and a press piece 35 at a rear end thereof. A spring 36 is provided to fit over the press piece 35 and that part of the lock post 33 exposed on the outside of the escutcheon 3. Besides, the escutcheon 3 is provided with a lock spring 37 near the press piece 35, the lock spring 37 projecting from the rear end of the escutcheon 3 for abutting the inner wall of a gear shift head A. The position of the press piece 35, after assembly, corresponds to the other end of the conventional gear shift push button of the gear shift head A.

The cylinder 4 is provided for receiving the core 1 and is internally provided with the cylinder hole 41. The cylinder 4 further has an opening 42 formed at a front end thereof for passage of a key.

Figure 2:
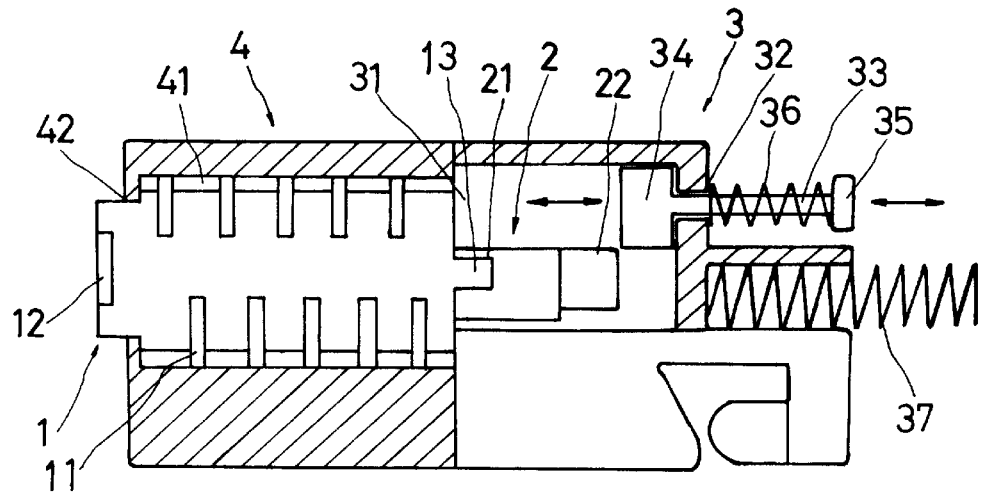
FIG. 2 is a schematic sectional view of the present invention.
Figure 3:
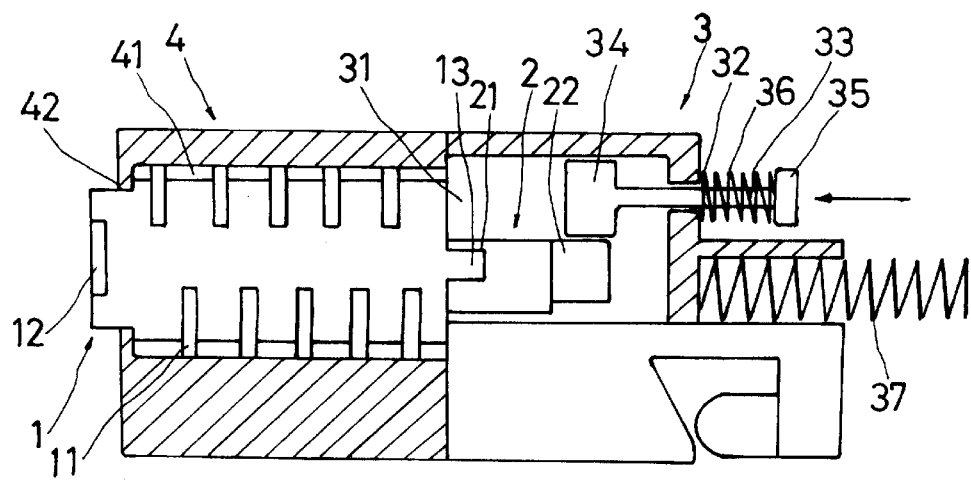
FIG. 3 is a sectional view showing the unlocked state of the present invention.
Figure 4:
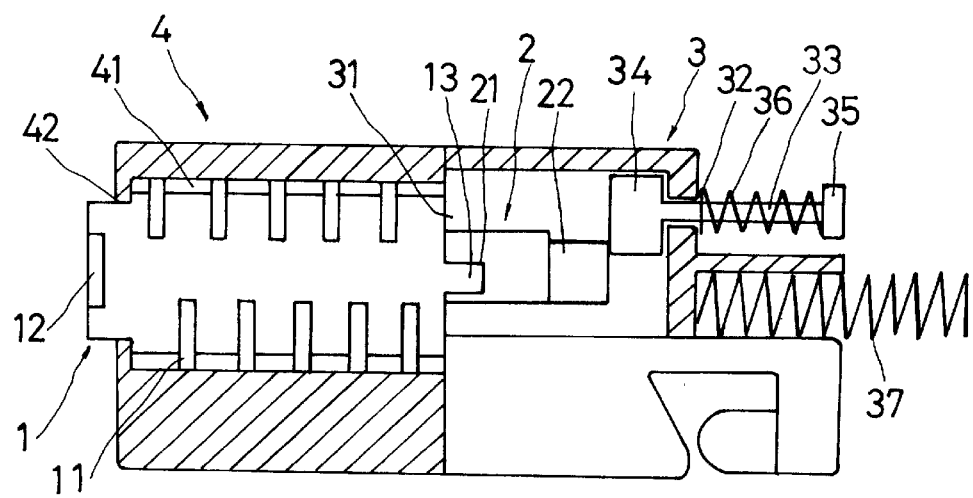
FIG. 4 is a sectional view showing the locked state of the present invention.

Referring to the drawings, during assembly, the core 1 is received in the cylinder 4, and the keyway 12 together with its outer wall projects from the cylinder 4 (see FIGS. 2–4). The front end of the stop block 2 is coupled to the rear end of the core 1 by means of the stop hole 21 receiving the projection 13 of the core 1. The rear end of the stop block 2 is inserted into the insertion hole 31 of the escutcheon 3. The lock assembly is then fitted into a recess B of the gear shift head A with the lock spring 37 urging tightly against the inner wall of the gear shift head A.

Reference is made to FIGS. 2 and 4 which illustrate operation of the lock of the invention in use. Referring to FIG. 2 which shows the lock in an unlocked state, by pressing the gear shift push button, the press piece 35 is pushed by the other end of the push button so that it displaces. Then gear shifting may proceed, as shown in FIG. 3. But when the lock of the invention is in a locked state, a key inserted into the core 1 turns the stop block 2 so that the stop projection 22 displaces to the rectangular shape of the insertion hole 31 and held in position. At this time, if the push button of the gear shift is pressed, the head portion 34 of the lock post 33 will be stopped from displacement by the stop projection 22. In this way, the gear shift is prevented from operation.

As can be seen from the above, the lock of the present invention is simple in construction and easy to assemble. Besides, the locking effect is positive and enhanced.

Although the present invention has been illustrated and described with reference to the preferred embodiment thereof, it should be understood that it is in no way limited to the details of such embodiment but is capable of numerous modifications within the scope of the appended claims.

What is claimed is:

1. A lock adapted for use in automatic gear shifts and mounted in a gear shift head, said lock comprising:

a core, having a plurality of latch bolts at either side, a keyway at a front end, and a projection at a rear end;

a stop block, having a stop hole at a front end for receiving said projection of said core, and a stop projection at a rear end;

an escutcheon, having an insertion hole at a front end, said insertion hole having a cross section comprised of an oval shape and a rectangular shape sized to match said stop block, a through hole at a rear end, and a lock post that passes through said through hole, said lock post including a head portion of a larger size and a press piece projecting from the rear end of said escutcheon, a spring being fitted over said press piece and a part of said lock post exposed on an outside of the rear end of said escutcheon, a lock spring being further provided on said escutcheon near said press piece and adapted to urge against an inner wall of the gear shift head, the position of said press piece corresponding to that of a push button mounted inside said gear shift head; and a cylinder, having an opening at a front end for passage of a key, and a cylinder hole communicating with said opening for receiving said core, whereby when said press piece is pressed by the push button of the gear shift, the press piece is displaced to permit operation of the gear shift when said lock is unlocked, and wherein the gear shift is prevented from operation by stopping displacement of said press piece with said stop projection of said stop block when said lock is locked.

* * * * *